(12) United States Patent
Langley et al.

(10) Patent No.: US 7,157,388 B2
(45) Date of Patent: Jan. 2, 2007

(54) OUTDOOR FABRIC

(75) Inventors: John D. Langley, Guntersville, NC (US); Todd R. Carroll, Guntersville, AL (US); Barry S. Hinkle, Guntersville, AL (US); Charles T. Vencill, Guntersville, AL (US)

(73) Assignee: Kappler, Inc., Guntersville, AL (US)

( * ) Notice: Subject to any disclaimer, the term of this patent is extended or adjusted under 35 U.S.C. 154(b) by 26 days.

(21) Appl. No.: 10/858,351

(22) Filed: Jun. 1, 2004

(65) Prior Publication Data

US 2005/0014433 A1 Jan. 20, 2005

Related U.S. Application Data

(60) Provisional application No. 60/475,084, filed on Jun. 2, 2003, provisional application No. 60/488,174, filed on Jul. 17, 2003.

(51) Int. Cl.
 *B32B 27/12* (2006.01)
 *B32B 5/26* (2006.01)

(52) U.S. Cl. .................. 442/76; 442/79; 442/86; 442/268; 442/304; 442/327

(58) Field of Classification Search ............ 442/76, 442/79, 86, 268, 304, 327
See application file for complete search history.

(56) References Cited

U.S. PATENT DOCUMENTS 4,761,324 A * 8/1988 Rautenberg et al. ........ 428/198

| | | |
|---|---|---|
| 5,939,341 A | 8/1999 | Brown et al. |
| 6,100,208 A | 8/2000 | Brown et al. |
| 2003/0194929 A1* | 10/2003 | Mun ..................... 442/76 |

FOREIGN PATENT DOCUMENTS

| | | |
|---|---|---|
| EP | 0 322 777 A | 7/1989 |
| EP | 0 885 924 A | 12/1998 |
| WO | WO 99/62997 A | 12/1999 |

* cited by examiner

*Primary Examiner*—Terrel Morris
*Assistant Examiner*—Matthew Matzek
(74) *Attorney, Agent, or Firm*—Alston & Bird LLP

(57) ABSTRACT

A unique and novel durable environmentally stabilized, waterproof, and moisture vapor permeable composite sheet material is described that includes a moisture permeable monolithic film, coating, or film/nonwoven laminate, that is held in close proximity to one or more layers of durable strength enhancing fabrics. The strength enhancing fabrics can include cotton, polyester, cotton/polyester blends, acrylic, and other synthetic materials and blends. The breathable monolithic film or coating is preferably polyester or polyurethane based. The breathable and durability enhancing layers are preferably laminated using hot melt adhesives such as polyester-based powder bond adhesives or using solvent-based polyurethane adhesives. The disclosed composite sheet material is uniquely designed for use in tents, tarps, mooring and trailerable boat and personal watercraft (PWC) covers, marine and outdoor furniture upholstery, inflatables, and other outdoor applications requiring waterproofness and breathability during extended outdoor exposure.

14 Claims, 2 Drawing Sheets

OUTDOOR FABRIC

CROSS-REFERENCE TO RELATED APPLICATIONS

This application is related to and claims priority from U.S. Provisional Patent Application Nos. 60/475,084 filed Jun. 2, 2003 and 60/488,174 filed Jul. 17, 2003, the contents of which are incorporated herein by reference.

FIELD AND BACKGROUND OF THE INVENTION

This invention relates generally to outdoor fabrics and more specifically to waterproof, breathable composite sheet materials designed primarily for use in mooring and trailerable boat and personal watercraft (PWC) covers, tents, outdoor furniture and marine upholstery, and inflatables.

BRIEF SUMMARY OF THE INVENTION

Textiles and composite materials designed and configured for outdoor exposure ideally exhibit high degrees of water resistance, UV blocking (i.e., prevent fading of covered items) and UV resistance (i.e., resist UV degradation) characteristics, appealing aesthetic qualities, durability, functionality, and easy manufacturability. Common uses for outdoor materials include boat and PWC covers and bimini tops, outdoor furniture and marine upholstery, tents and awnings, inflatables, tonneau tops and covers, as well as a host of other applications. The application and use of these outdoor fabrics can be static as in the case of upholstery; semi-static as in the case of mooring covers, tents, umbrellas and awnings; or dynamic, as in the case of trailerable boat, PWC, and tonneau covers. Wilson U.S. Pat. No. 3,604,440, Frink U.S. Pat. No. 6,223,680, and Murphy U.S. Pat. No. 6,439,150 describe a variety of uses for outdoor marine type cover materials.

The marine industry, and more specifically the cover and upholstery sectors, is a significant consumer of traditional outdoor textile fabrics. The historical progression of outdoor marine fabrics starts with simple plastic-type tarpaulins such as those described by Graves U.S. Pat. No. 3,862,876, Herminghaus U.S. Pat. No. 3,987,592, and Osborn U.S. Pat. No. 4,682,447. Seeing the limited usefulness of plastic sheeting, the industry began using traditional 10 ounce per square yard (osy) cotton duck which today comprises a major portion of the entry level reusable boat and PWC cover market. Major advantages of cotton include a high degree of breathability and attractive economics. The major disadvantages of cotton include weight, propensity for rotting, UV resistance, and poor resistance to water penetration (i.e., waterproofness).

To improve on the limitations of outdoor cotton fabrics, the industry responded with several weights of tightly woven polyester (PET). While offering improved strength at lighter weights, improved UV stability, essentially no rot, and much improved water resistance as compared to cotton, the weave on these PETs was so tight as to drastically decrease breathability. The compromise came with the introduction of cotton/PET blends in percentages approaching 50/50. Here a balance was achieved between breathability, water resistance, and strength. Still suffering from some of the limitations of cotton (i.e., rot, etc.) the industry responded with the development of several durable, high strength solution dyed acrylic woven fabrics marketed primarily as Sunbrella® by Glen Raven Mills and Outdura® by Shuford Mills. The acrylic fabrics offer an improvement over previous fabrics since they offer very high resistance to outdoor weatherability, high weight to strength ratios, no rot, and a balance between breathability and water resistance.

It should be evident that a balance is required between breathability and waterproofness as they apply to outdoor textiles. In the case of marine covers and upholstery, the textile should ideally prevent water (i.e., rain) from penetrating the material, but allow the escape of moisture resulting from other sources including condensation beneath the cover or upholstery and allow for drying of a wet boat or PWC after use. The result of an imbalance between breathability and waterproofness is rust, and the build-up of mold and mildew.

The degree of water resistance exhibited by textiles and composite materials is commonly described as either "water repellant" or "waterproof". Water repellency can be satisfactory for short term, intermittent exposures to rain and other high humidity environments. This degree of water resistance is easily and economically achieved using a variety of common fluorocarbon-based or silicone-based surface and/or fiber treatments such as Durepl® (Burlington Industries) Zepel® (DuPont), and Sili-Tex® (Sili-Tex), or others as described by Bullock (U.S. Pat. No. 6,541,138). Employed on a wide range of fashion garments and numerous outdoor cover products, water repellent materials have enjoyed wide spread acceptance and offer a good balance between cost and functionality for short term intermittent exposures. One benefit of water resistance over waterproofness is that water resistance can typically be achieved while maintaining a high degree of air flow (i.e., breathability) through the textile or composite material.

Waterproofness is a level of water resistance that is not achievable through traditional surface treatments and is required for situations involving sustained and dynamic exposure to rain and other high humidity environments such as should be expected in marine applications. The characteristic of waterproofness has been successfully engineered into numerous textile and composite materials using a variety of coatings, films, and membranes. These approaches can be segregated as non-breathable in the case of textiles coated with or laminated to films of polyvinyl chloride, neoprene, acrylic, and certain polyurethanes; or as breathable, in the case of various monolithic and microporous films and coatings.

The marine market has elected to support waterproof but non-breathable composite fabrics. Commercial examples of these textile composites include Marine Tex®, Clarion®, Stamoid®, SurLast® and Sundura® all of which are variations of PET based textiles that have been coated with vinyl or non-breathable polyurethane. Other examples include vinyl coated denim which is used extensively for bimini tops and boat enclosures and vinyl coated nonwoven which is used extensively for marine upholstery. While functional as moisture barriers, the lack of breathability of these materials can lead to rust, mold, and mildew. Szukhent, Jr. U.S. Pat. No. 4,379,468 highlights this phenomenon and discloses a venting system to be use with marine type covers to prevent moisture build-up beneath the cover.

Several attempts have been made to combine varying degrees of waterproofness and breathability for marine applications. While marginally successful, these primarily polyolefin-based composites are very lightweight offering marginal strength characteristics that cannot survive the rigors of semi or fully dynamic use such is the case for transportable covers and marine upholstery. Examples of these type materials are disclosed by Langley U.S. Pat. No.

5,728,451, Brown U.S. Pat. Nos. 5,662,978, 5,939,341, and 6,100,208, and Srinivasan U.S. Pat. No. 6,524,981. Several commercially available examples of these materials include DuraVent® (Kappler, Inc.) and Evolution® and Block-it® (both offered by Kimberly Clark). Again while functional for less rigorous applications such as mooring and car covers, these materials cannot withstand the continuous severe shear and mechanical stresses induced on for example a bass-type boat being driven repeatedly down the highway at 70 m.p.h.

Another variant on the non-breathable water resistant cover material is available through Transhield (Elkhart, Ill.). This material combines a more durable nonwoven substrate with a non-breathable polyolefin-based exterior film. Covered under U.S. Pat. No. 5,491,017, this material also offers the properties of shrinkability but still offers essentially no breathability.

It should be evident from the discussion above, that the need exists for a durable waterproof breathable, environmentally stabilized composite textile for use in rigorous and dynamic marine and other outdoor cover and upholstery applications.

SUMMARY OF THE INVENTION

The present invention provides a waterproof breathable composite fabric comprising an exterior fabric layer of a woven, knitted, or nonwoven textile material, and a nonporous, water impermeable, moisture vapor permeable layer bonded to an inner surface of the exterior layer. The moisture vapor permeable layer is highly stabilized against UV degradation by at least one of a UV absorber material and a UV stabilizer compound. Desirably, the layer contains a combination of at least one UV absorber and a hindered amine UV light stabilizer. The layer may advantageously contains carbon black as a UV absorber material. Preferably, the water impermeable, moisture vapor permeable layer is a nonporous, monolithic layer formed from a polymer selected from the group consisting of polyester, copolyester, polyurethane, copolyether ester block copolymer, copolyether amide polymers, copoly(etherimide)ester, and/or blends thereof. In one aspect of the invention, the water impermeable, moisture vapor permeable layer is a coating adhered to the inner surface of the exterior fabric layer. In another advantageous aspect of the invention, the water impermeable, moisture vapor permeable layer is a film laminated to the inner surface of the exterior fabric layer by an adhesive.

In a preferred embodiment the exterior fabric layer is woven from yarns made from solution dyed acrylic, modacrylic and/or polyester fibers, and the moisture vapor permeable layer is a nonporous monolithic film comprising a polymer selected from the group consisting of polyester, copolyester, polyurethane, copolyether ester, copolyether amide, copoly(etherimide)ester and/or blends thereof. The film is highly stabilized against UV degradation by at least one of a UV absorber material and a UV stabilizer compound. Additionally, the composite includes an interior fabric layer of a woven, knitted or nonwoven textile material, such that the monolithic film is sandwiched between the exterior and interior fabric layers.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

The present invention provides for a novel durable environmentally stabilized, waterproof, and moisture vapor permeable composite sheet material comprising a water impermeable, moisture vapor permeable monolithic film or coating that is held in close proximity to one or more layers of durable strength enhancing fabrics. The composite can be either a bi- or tri-laminate having textile materials on one or both surfaces of the breathable film. Bi-laminate structures are best suited for semi-static applications such as awnings, umbrellas and upholstery, while the tri-laminates are better suited for dynamic scenarios that include abrasive and shear forces such as covers. Items constructed using the subject waterproof/breathable composites can be assembled using common manufacturing equipment such as sewing machines, ultrasonic welding machines, and hot air welding machines, thus rendering the end product completely waterproof given the hermetically sealed, water-tight seam.

Figure 1:
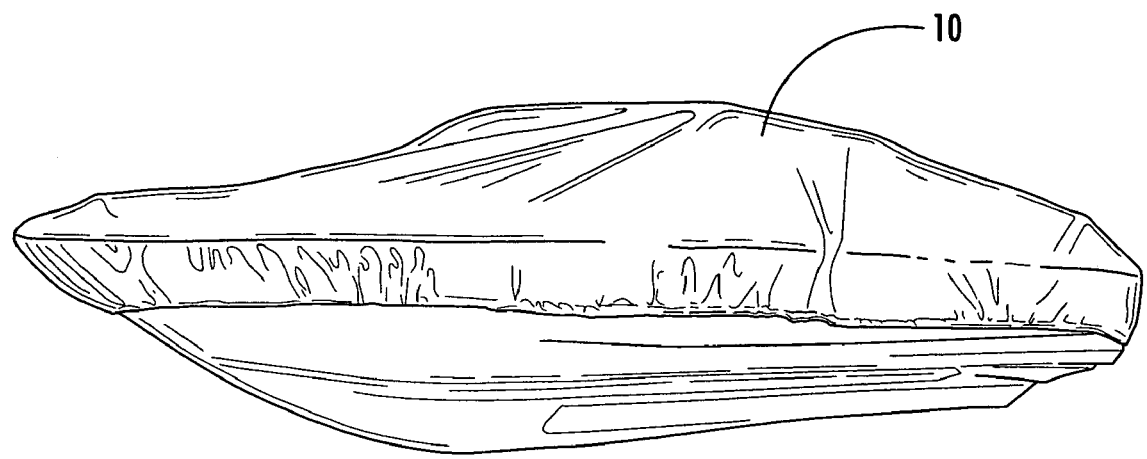
FIG. 1 is a perspective view of a boat cover formed from an outdoor fabric in accordance with one embodiment of the present invention.
Figure 2:
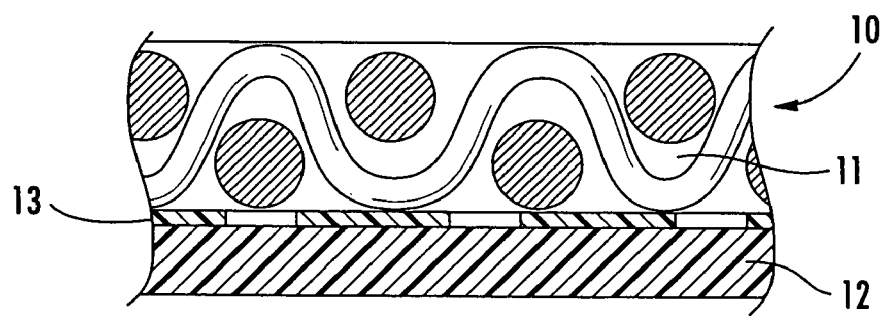
FIG. 2 is a schematic cross-sectional view of the boat cover fabric of FIG. 1.
Figure 3:
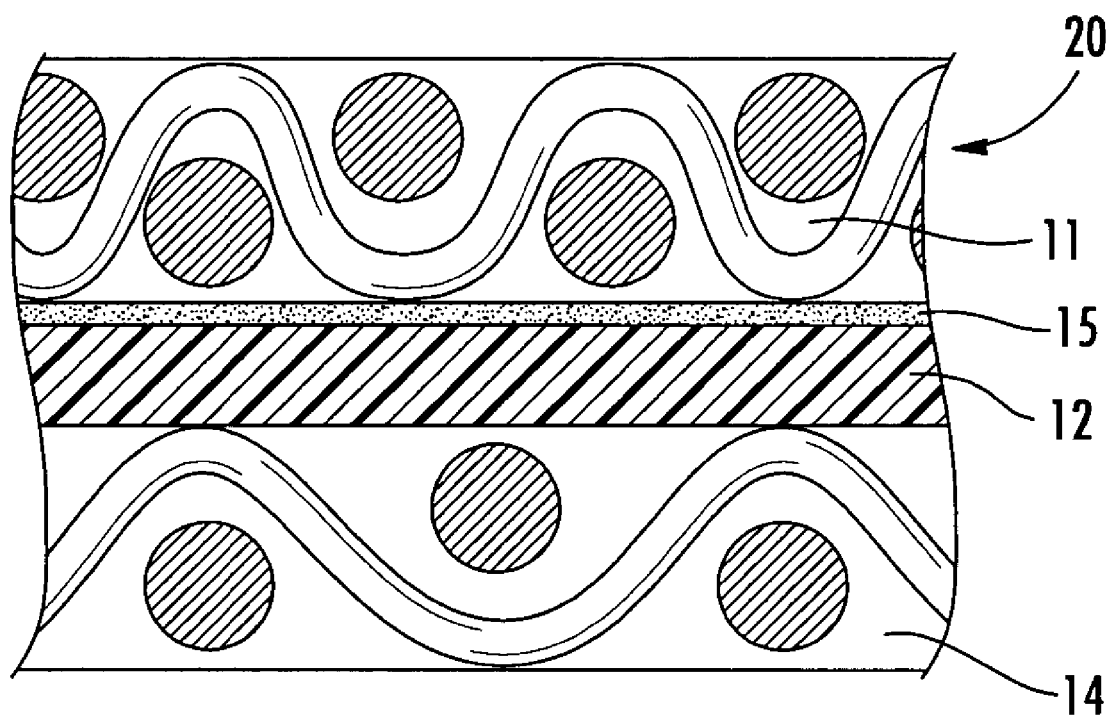
FIG. 3 is a schematic cross-sectional view of an outdoor fabric in accordance with another embodiment of the present invention.

FIG. 1 illustrates a boat that has been covered by a boat cover fabricated from a composite breathable waterproof outdoor fabric 10 in accordance with one embodiment of the present invention. As seen in greater detail in FIG. 2, the composite outdoor fabric 10 includes a strength enhancing exterior fabric layer 11 and a nonporous, water impermeable, moisture vapor permeable barrier layer 12 laminated to an inner surface of the exterior fabric layer 11 by a discontinuous adhesive layer 13. FIG. 3 illustrates a tri-laminate composite fabric 20 in accordance with a further embodiment of the present invention in which an interior layer 14 of a woven, knitted or nonwoven textile material is provided on the opposite side of the barrier layer 12 from the exterior layer 11. The interior fabric may be comprised of polyethylene, polypropylene, nylon, polyester, rayon, acetate, polyurethane, cotton, acrylic, spandex, and/or blends thereof, and may be comprised of bicomponent fibers. The interior fabric layer 14 may be laminated to the inner surface of film 12 by a suitable adhesive, such as a hot melt adhesive or a solvent based polyurethanes adhesive.

The strength enhancing fabric layer 11 can include woven, knitted or nonwoven textile fabric materials made from cotton, polyester, cotton/polyester blends, acrylic, modacrylic and other synthetic materials and blends. To improve field performance, these textiles can be modified to enhance their resistance to thermal and UV degradation through common base polymer additives and/or surface treatments. Antimicrobial additives including nitrophenyl acetate, phenylhydrazine, polybrominated salicylanilides, chlorhexidine, domaphen bromide, cetylpyridinium chloride, benzethonium chloride, 2,2'-thiobisthiobis (4,6-dichloro)phenol, 2,2'-methelenebis(3,4,6-trichloro)phenol, 2,4,4'-trichloro-2'-hydroxydiphenyl ether, and or other similar anti-microbial agents of which Microban® is a commercially available example can be added to one or more layers of the composite (see U.S. Pat. No. 4,343,853). Weimer, et al. (U.S. Pat. No. 5,690,949) describes the use of fluorochemical additives as a method of improving the repellency characteristics of breathable composites, preferable are fluorochemical oxazoidalinone compounds and fluorochemical amino alcohol compounds, and amorphous fluoropolymer of which Teflon® is a commercial example.

Especially preferred for use as the strength enhancing fabric layer 11 are woven fabrics made from solution dyed yarns, and in particular fabrics woven from yarns made from solution dyed acrylic, modacrylic and/or polyester fibers. Such fabrics have excellent colorfastness and resistance to thermal and ultraviolet degradation. Preferably, the strength enhancing fabric layer 11 has a basis weight from five to 20 ounces per square yard (osy), desirably 7 to 15 osy depending upon the specific end-use application. Commercially available examples of this type of fabric include the Sunbrella® line of solution dyed acrylic fabrics by Glen Raven Inc., the Sunbrella® Firesist® solution dyed modacrylic fabrics by Glen Raven Inc. and the Outdura® line of solution dyed acrylic fabrics from Shuford Mills Inc.

The nonporous, water impermeable, moisture vapor permeable barrier layer 12 is a monolithic film or coating preferably formed from a polymer selected from the group consisting of polyester, copolyester, polyurethane, copolyether ester, copolyether amide, copoly(etherimide)ester and/or blends thereof. Commercial examples of such materials include Aptra M (RKW GmbH), and films like Sympatex® which is made from a monolithic copolyester ether resin film. Lim (U.S. Pat. No. 6,410,465), incorporated herein by reference, discloses several other types of waterproof/breathable films and membranes such as copolyether ester block copolymers such as Hytrel® (DuPont), polyether-block co-polyamide polymers such as Pebax® (Atofina Chemicals), thermoplastic polyurethanes such as Estane® (Noveon Inc.), Dynapol® and Dynacoll® (Creanova, Inc.), and copoly(etherimide)esters as described by Hoechst (U.S. Pat. No. 4,868,062), all of which are equally applicable to the subject patent so long as they include appropriate environmental stabilization as discussed below.

Critical to the performance of the subject application is the environmental stability of the breathable layer 12. Outdoor covers, awnings, and marine upholstery see extended exposure to direct sunlight. This exposure includes both UV and thermal threats which results in a very aggressive and synergistic combination of thermal and photodegradation. UV degradation is controlled through the use of UV inhibitors as described by Beer's Law which states that absorption of damaging UV radiation is influenced by additive concentration and the distance the light must travel through the film. In layman terms this means that greater UV stability can be achieved by adding larger quantities of UV absorptive additives and/or by increasing product thickness.

UV absorbers (UVAs), such as those benzotriazoles available from Ciba-Geigy perform as described by adsorbing the damaging UV radiation passing into and through a material. An alternative approach to reducing the affects of photodegradation is with the use of light stabilizers commonly known as hindered amine light stabilizers (HALS), also available through Ciba-Geigy under the trade name Chimassorb®. While UVAs absorb the radiation, HALS function by an alternative mechanism that is not constrained by Beer's Law. Therefore, HALS are traditionally effective at the surface and in comparison are typically more effective than UVAs. Numerous UV stabilizers are known in the art which may be added to the outer durability enhancing layers as well as the nonporous breathable layer 12 to achieve the desired level of performance. Examples of such stabilizers include, but are not limited to: 2-hydroxybenzophenones; 2-hydroxybenzotriazoles; hydroxybenzoates; metal chelate stabilizers; hindered amine light stabilizers; metal chelate stabilizers as described by Doyle (U.S. Pat. No. 3,206,431), Spivak (U.S. Pat. Nos. 3,935,164 and 3,943,102), Hudson (U.S. Pat. No. 5,200,443), and Arnold (U.S. Pat. No. 5,707,468). Other commercially available stabilizers include those under the trade name HOSTAVIN N30 from Hoescht Celanese Corporation; CYASORB UV-3346 from Cytec Industries of West Patterson, N.J.; UVASIL-299 from Great Lakes Chemical Company of West Lafayette, Ind. and UVINOL 4049 from BASF. Masterbatch additive packages are also available through A. Schulman under the trade names Polybatch® UV and Polyblack®.

The water impermeable, moisture vapor permeable barrier layer 12 of the present invention should be highly stabilized against environmental UV degradation, using UVA's such as those described above, UV stabilizers, such as those described above, and preferably a combination of UVA's and UV stabilizers. Preferably, the layer is also highly stabilized against environmental thermal degradation using thermal stabilizers and antioxidants.

In one preferred embodiment, a monolithic nonporous black copolyether ester resin film layer is used that contains a visible amount of carbon black as a natural UV stabilizer along with other common UV stabilizers and antioxidants. This copolyether ester resin film is formed from multi-block copolymers which are essentially a repeating chain of soft and hard segments alternating repeatedly along the polymer backbone. The resins preferably include butylene terephthalate (BTP) as the hard segment and a polyalkylene oxide as the soft segment. A particularly preferred resin film layer is formed from a blend of a first polyether ester resin which has polytetramethyleneoxide (PTMG) as the soft segment and butylene terepthalate (BTP) as the hard segment and a second polyether ester resin which contains a comonomer of polyethyleneoxide (PEO) and polypropyleneoxide (PPO) as the soft segment and butylene terephthalate (BTP) as the hard segment. This resin blend is highly environmentally stabilized with UV stabilizer, carbon black UV absorber, and antioxidants.

While other breathable films, especially those characterized as microporous are being sold into the outdoor cover market (i.e., see Brown) including car and boat covers as well as roofing underlayment especially in Europe, these materials have such large internal surface areas so as to push the limit of conventional additive technology. While the inventors recognize the usefulness of these type microporous films as discussed in other published and as of yet unpublished patent applications, the documented limited practical service life of these type films make them impractical for use in the subject patent since here we are combining more rugged outer layers than the lightweight spun-bonded polypropylenes included in the DuraVent® and Block-It® type composite described earlier.

The breathable and durability enhancing layers of the subject patent are preferably laminated using traditional lamination techniques commonly know in the art and include either hot melt adhesives such as polyester-based copolymer powder bond adhesives or solvent-based polyurethane adhesives, commercial examples of which are available from EMS-Griltech (Sumter, S.C.), H.B. Fuller (St. Paul, Minn.), and Rohm and Haas (Philadelphia, Pa.).

This novel use of otherwise non-environmentally stable breathable nonporous films, membranes, and composites, expands their usefulness beyond their traditional boundaries. The fabrics are especially well-suited for use in a variety of outdoor environments including marine applications, such as boat covers, tops and upholstery, outdoor furniture, tents, awnings, and inflatables. The fabrics may also be used in the manufacture of waterproof apparel, such as jackets, rainsuits, hats, caps and gloves. When used in apparel applications, the strength enhancing outer fabric layer may be made of apparel fabrics incorporating natural and/or synthetic fiber yarns, such as cotton, acrylic, nylon, and polyester for example. A novel use of the fabric is in inflatables such as temporary mattresses, water toys, rafts, etc. Polyvinyl chloride (PVC) is the predominant material of construction for these items due to its inherent flexibility, low cost, heat sealability, and resistant to air penetration. Neoprene and butyl rubber have been used in items such as rafts and other items requiring greater abrasion resistance and strength characteristics. These type items are inflated by mouth or pump, and as such can contain a significant amount of moisture within the inflatable. Internal moisture combined with use of the items in wet environments can lead to staining and degradation resulting from the growth of mold and mildew within and on the surface of the inflatable. Using the fabric of the present invention in these applications makes advantageous use of the inherent moisture permeability of the composite fabric and will prevent and minimize the build-up of mold and mildew within and on the surface thus extending the usable service-life the inflatable items. An added feature is that the items will also be "self drying" since moisture will still be able to permeate through the item if folded and put up wet.

Several embodiments of the disclosed invention have been conceived to demonstrate the potential breadth and significance of the claimed art. Inclusion of these embodiments in no way serves to limit the potential breath and applicability of the disclosed art to other configurations and or uses.

EXAMPLE 1

A waterproof breathable bi-laminate composite was fabricated using one layer of 8 osy solution dyed acrylic available under the trade name Outdura® and one layer of an approximately 35 gsm breathable nonporous copolyester film available under the trade name Aptra® M (RKW GbmH).

These layers were laminated by applying between 10 and 25 gsm of a copolyester-based powder bond adhesive (EMS-Griltex) to one surface of the acrylic layer and heating the adhesive to above its softening point by bringing the adhesive laden textile through an oven set to 250–375° F. and at a speed of between 50–125 feet per minute. The polyester film was brought in contact with the adhesive laden acrylic directly after the oven by way of a nip, the pressure of which was set at a level to achieve sufficient bond. The resulting bi-laminate composite had a basis weight of 9.4 osy per ASTM D751, a grab tensile strength of greater than 200 pounds/inch in the machine direction and greater than 140 pounds/inch in the transverse direction, a tongue tear strength of greater than 10 pounds/inch in the machine direction and greater than 14 pounds/inch in the transverse direction, and a peel strength of greater than 200 g/inch, all of which were in accordance with ASTM D751. The composite also exhibited a moisture vapor transmission rate greater than 390 gms/m$^2$/24 hr per ASTM E96.

EXAMPLE 2

A similar bi-laminate composite was fabricated as in example 1, however an 11 osy solution dyed acrylic textile was used. The resulting bi-laminate composite had a basis weight of 10.4 osy per ASTM D751, a grab tensile strength of greater than 210 pounds/inch in the machine direction and greater than 165 pounds/inch in the transverse direction, a tongue tear strength of greater than 8 pounds/inch in the machine direction and greater than 13 pounds/inch in the transverse direction, and a peel strength of greater than 190 g/inch, all of which were in accordance with ASTM D751. The composite also exhibited a moisture vapor transmission rate greater than 450 gms/m$^2$/24 hr per ASTM E96.

EXAMPLE 3

A tri-laminate embodiment was further fabricated using the bi-laminate composite of example 1, whereby an additional layer of lightweight (i.e., 1–2 osy) knitted polyester was laminated to the film surface of the example 1 composite. Similar to examples 1 and 2, 10–25 gsm of a copolyester-based powder bond adhesive available form EMS-Griltex was applied to one surface of the polyester textile, the adhesive laden textile brought through the oven, and subsequently laminated to the film/textile composite of example 1 under sufficient heat and pressure to achieve an acceptable bond. The resulting tri-laminate composite had a basis weight of 11.2 osy per ASTM D751, a grab tensile strength of greater than 240 pounds/inch in the machine direction and greater than 130 pounds/inch in the transverse direction, a tongue tear strength of greater than 11 pounds/inch in the machine direction and greater than 20 pounds/inch in the transverse direction, and a peel strength of greater than 220 g/inch at the acrylic/film interface and greater than 125 g/inch at the polyester/film interface, all of which were in accordance with ASTM D751. The composite also exhibited a moisture vapor transmission rate greater than 425 gms/m$^2$/24 hr per ASTM E96.

EXAMPLE 4

A similar bi-laminate composite was fabricated as in example 1, however, with the exception that the powder bond adhesive process was replaced with a discontinuous layer of a solvent-based urethane adhesive, application weight and lamination conditions being those commonly know in the art such as described by Gore (U.S. Pat. No. 4,194,041) and Blauer (U.S. Pat. No. 5,593,754).

EXAMPLE 5

A tri-laminate of a solution dyed acrylic, breathable copolyester film and a lightweight woven polyester was fabricated using the same polyurethane adhesive as described in example 4.

EXAMPLE 6

Bi- and tri-laminate composites were further fabricated according to examples 4 and 5 however with the substitution of a breathable polyurethane film of thickness between 1 and 5 mils.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A waterproof breathable composite fabric comprising an exterior fabric layer woven or knitted from yarns made from solution dyed acrylic, modacrylic and/or polyester fibers, said exterior fabric layer having an outer surface and an inner surface, and a nonporous water impermeable, moisture vapor permeable layer bonded to said inner surface of the exterior fabric layer, said moisture vapor permeable layer being a nonporous, monolithic layer formed from a blended resin comprising a multi-block copolymer including a repeating chain of soft and hard segments, wherein the multi-block copolymer comprises a blend of a first polyether ester resin which has polytetramethyleneoxide (PTMG) as the soft segment and butylene terepthalate (BTP) as the hard segment and a second polyether ester resin which contains a comonomer of polyethyleneoxide (PEO) and polypropyleneoxide (PPO) as the soft segment and butylene terephthalate (BTP) as the hard segment, and said nonporous water impermeable, moisture vapor permeable layer containing a combination of at least one UV absorber and a hindered amine UV light stabilizer to stabilize the nonporous water impermeable, moisture vapor permeable layer against UV degradation, and a discontinuous adhesive layer between said exterior fabric layer and said nonporous water impermeable, moisture vapor permeable layer bonding the moisture vapor permeable layer to said inner surface of the exterior fabric layer to form a durable waterproof breathable composite fabric.

2. The breathable composite fabric of claim 1, wherein the nonporous, moisture permeable layer contains carbon black as a UV absorber material.

3. The breathable composite fabric of claim 1, wherein the composite fabric has a MVTR greater than 390 gms/m$^2$/24 hours.

4. The breathable composite fabric of claim 1, wherein the water impermeable, moisture vapor permeable layer is a film laminated to said inner surface of the exterior fabric layer by an adhesive selected from the group consisting of polyolefins, polyethylene, polypropylene, polyester, copolyester, polyamide, copolyamide, and/or blends thereof.

5. The breathable composite fabric of claim 4, wherein said adhesive is a hot melt adhesive.

6. The breathable composite fabric of claim 4, where in the adhesive is a polyurethane.

7. The breathable composite fabric of claim 1, including an additional interior fabric layer laminated to the vapor permeable layer.

8. The breathable composite fabric of claim 7, wherein the interior fabric layer includes fibers or filaments comprising polyethylene, polypropylene, nylon, polyester, rayon, acetate, polyurethane, cotton, acrylic, spandex, and/or blends thereof.

9. The breathable composite fabric of claim 8, wherein the interior fabric layer is a woven fabric.

10. A waterproof breathable composite fabric comprising an exterior layer of a fabric woven from yarns made from solution dyed acrylic, modacrylic and/or polyester fibers, said layer having an outer surface and an inner surface, an interior layer of a woven, knitted or nonwoven textile material, and a water impermeable, moisture vapor permeable nonporous monolithic film positioned between the exterior and interior layers and bonded to said inner surface of the exterior layer, said film comprising a blended resin containing a UV absorber and a hindered amine light stabilizer, wherein the blended resin is a multi-block copolymer including a repeating chain of soft and hard segments, wherein the multi-block copolymer comprises a blend of a first polyether ester resin which has polytetramethyleneoxide (PTMG) as the soft segment and butylene terepthalate (BTP) as the hard segment and a second polyether ester resin which contains a comonomer of polyethyleneoxide (PEG) and polypropyleneoxide (PPO) as the soft segment and butylene terephthalate (BTP) as the hard segment.

11. The breathable composite fabric of claim 10, including an adhesive layer bonding the film to said inner surface of the exterior layer.

12. The breathable composite fabric of claim 11, wherein the adhesive is a polyurethane adhesive.

13. The breathable composite fabric of claim 11, including an additional adhesive layer between said film and said interior layer bonding the film to the interior layer.

14. A waterproof breathable composite fabric comprising an exterior layer of a woven fabric, said layer having an outer surface and an inner surface and woven from yarns made from solution dyed acrylic, modacrylic and/or polyester fibers, an interior layer of a woven, knitted or nonwoven textile material, and a water impermeable, moisture vapor permeable nonporous monolithic film positioned between the exterior and interior layers and bonded to said inner surface of the exterior layer by a discontinuous adhesive layer, said film formed from a blended resin comprising a multi-block copolymer including a repeating chain of soft and hard segments, wherein said multi-block copolymer comprises a blend of a first polyether ester resin which has polytetramethyleneoxide (PTMG) as the soft segment and butylene terepthalate (BTP) as the hard segment and a second polyether ester resin which contains a comonomer of polyethyleneoxide (PEO) and polypropyleneoxide (PPO) as the soft segment and butylene terephthalate (BTP) as the hard segment, and said film being highly stabilized against UV degradation by at least one of a UV absorber material and a UV stabilizer compound.

* * * * *

UNITED STATES PATENT AND TRADEMARK OFFICE
CERTIFICATE OF CORRECTION

PATENT NO.       : 7,157,388 B2                                     Page 1 of 1
APPLICATION NO.  : 10/858351
DATED            : January 2, 2007
INVENTOR(S)      : Langley et al.

It is certified that error appears in the above-identified patent and that said Letters Patent is hereby corrected as shown below:

Title Page,
(75) Inventors: "Guntersville, NC" should read --Guntersville, AL--.

Column 10,
Line 9, "yams" should read --yarns--:
Line 24, "(PEG)" should read --(PEO)--.

Signed and Sealed this

Tenth Day of April, 2007

JON W. DUDAS
*Director of the United States Patent and Trademark Office*